US011485585B1

(12) United States Patent
Bitondo et al.

(10) Patent No.: US 11,485,585 B1
(45) Date of Patent: Nov. 1, 2022

(54) INVERTED BRUSHLESS CONVEYOR BELT CLEANER SYSTEM

(71) Applicants: Steven Bitondo, Stamford, CT (US); Victor A. Ceci, Stamford, CT (US); Joseph Franzino, Stamford, CT (US)

(72) Inventors: Steven Bitondo, Stamford, CT (US); Victor A. Ceci, Stamford, CT (US); Joseph Franzino, Stamford, CT (US)

( * ) Notice: Subject to any disclaimer, the term of this patent is extended or adjusted under 35 U.S.C. 154(b) by 0 days.

(21) Appl. No.: 17/475,919

(22) Filed: Sep. 15, 2021

Related U.S. Application Data

(63) Continuation-in-part of application No. 17/408,716, filed on Aug. 23, 2021, now Pat. No. 11,242,210.

(51) Int. Cl.
| | |
|---|---|
| *B65G 45/24* | (2006.01) |
| *B65G 45/12* | (2006.01) |
| *B65G 45/22* | (2006.01) |
| *B08B 3/00* | (2006.01) |
| *B08B 5/04* | (2006.01) |
| *B08B 1/00* | (2006.01) |
| *A21B 3/16* | (2006.01) |

(52) U.S. Cl.
CPC ............... *B65G 45/24* (2013.01); *A21B 3/16* (2013.01); *B08B 1/005* (2013.01); *B08B 3/00* (2013.01); *B08B 5/04* (2013.01); *B65G 45/12* (2013.01); *B65G 45/22* (2013.01); *B08B 2230/01* (2013.01)

(58) Field of Classification Search
CPC ........ B65G 45/22; B65G 45/24; B65G 45/12; A21B 3/16; B08B 5/04; B08B 1/005; B08B 3/00

USPC ......................................................... 198/495
See application file for complete search history.

(56) References Cited

U.S. PATENT DOCUMENTS

| | | | |
|---|---|---|---|
| 3,326,607 A | 6/1967 | Book | |
| 3,387,992 A | 6/1968 | Arthur | |
| 4,087,320 A | 5/1978 | Danahy | |
| 4,754,868 A | 6/1988 | Hughes | |
| 4,777,972 A | 10/1988 | Adam | |

(Continued)

FOREIGN PATENT DOCUMENTS

| | | |
|---|---|---|
| FR | 2630413 A1 | 10/1989 |
| GB | 1389957 A | 4/1975 |

(Continued)

*Primary Examiner* — James R Bidwell
(74) *Attorney, Agent, or Firm* — Gilbridge, Tusa, Last & Spellane, LLC

(57) ABSTRACT

A conveyor belt cleaner system comprising a platen subassembly positioned transversely of the return path of the conveyor belt; a steam chamber disposed adjacent a first portion of the conveyor belt, the steam chamber including a steam header; a vacuum chamber adjacent the steam chamber and disposed adjacent a second portion of the conveyor belt, the vacuum chamber having an outlet connectable to a source of vacuum; a first belt wiper in wiping defining an entrance to the steam chamber; a second belt wiper having a discontinuous wiping surface defining a septum between the vacuum and steam chambers; a third belt wiper defining an exit from the vacuum chamber; and apparatus including a rotatable bolt cooperative with the steam header to vary the width of steam application from the steam header onto the conveyor belt in accordance with a width of conveyor belt presented to the conveyor belt cleaner system.

11 Claims, 10 Drawing Sheets

(56) References Cited

U.S. PATENT DOCUMENTS

| | | | |
|---|---|---|---|
| 4,915,211 A | 4/1990 | Dohmeier | |
| 5,031,750 A | 7/1991 | Barnes | |
| 5,783,044 A | 7/1998 | Schneider | |
| 6,364,959 B1 | 4/2002 | Straub | |
| 6,601,692 B2 | 8/2003 | Schaefer | |
| 7,407,051 B1 | 8/2008 | Farris | |
| 7,784,476 B2 | 8/2010 | Handy | |
| 9,248,975 B2 | 2/2016 | Handy | |
| 10,150,623 B2 | 12/2018 | Handy | |
| 10,266,348 B1 * | 4/2019 | Yoo | B65G 45/18 |
| 10,507,986 B2 | 12/2019 | Rogan | |
| 10,836,586 B2 | 11/2020 | Schmidgall | |
| 10,954,077 B1 | 3/2021 | Yoo | |
| 11,242,210 B1 * | 2/2022 | Bitondo | B65G 45/26 |
| 2015/0047949 A1 * | 2/2015 | Rothe | B66B 31/02 |
| | | | 198/495 |
| 2015/0298915 A1 * | 10/2015 | Handy | B65G 45/26 |
| | | | 198/496 |
| 2020/0062513 A1 * | 2/2020 | Hutchison | B65G 45/12 |
| 2020/0407172 A1 * | 12/2020 | Vidrio Borrego | B65G 45/12 |
| 2021/0122582 A1 * | 4/2021 | Carlsson | F25D 13/067 |

FOREIGN PATENT DOCUMENTS

| | | | | |
|---|---|---|---|---|
| GB | 1420439 A | | 1/1976 | |
| GB | 2352703 | * | 2/2001 | B65G 45/24 |
| GB | 2352703 A | | 6/2003 | |
| JP | 3336899 B2 | | 10/2002 | |
| JP | 4515741 B2 | | 8/2010 | |
| KR | 20100109601 A | | 10/2010 | |
| WO | 2017046165 | * | 3/2017 | B65G 45/24 |

* cited by examiner

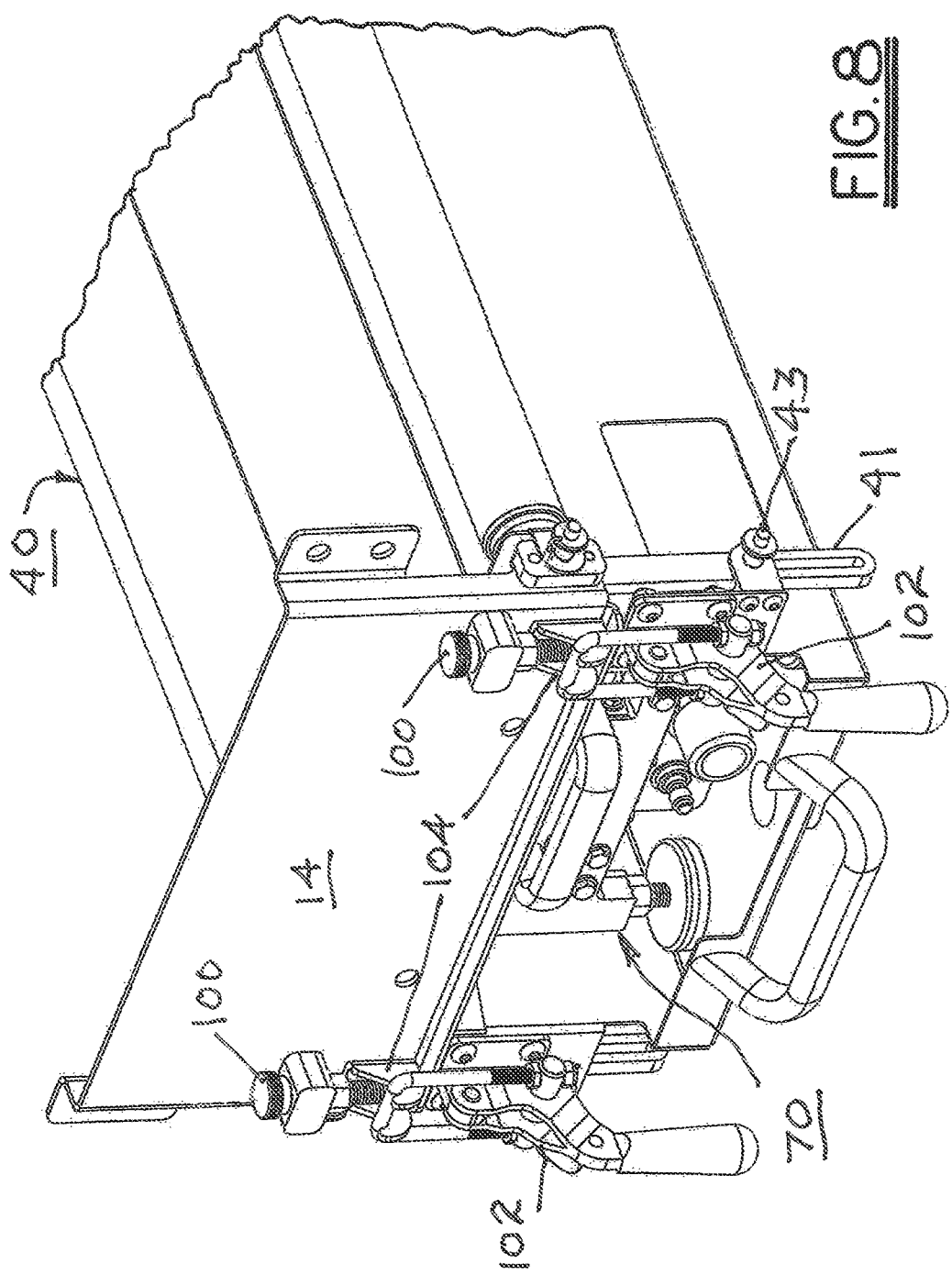

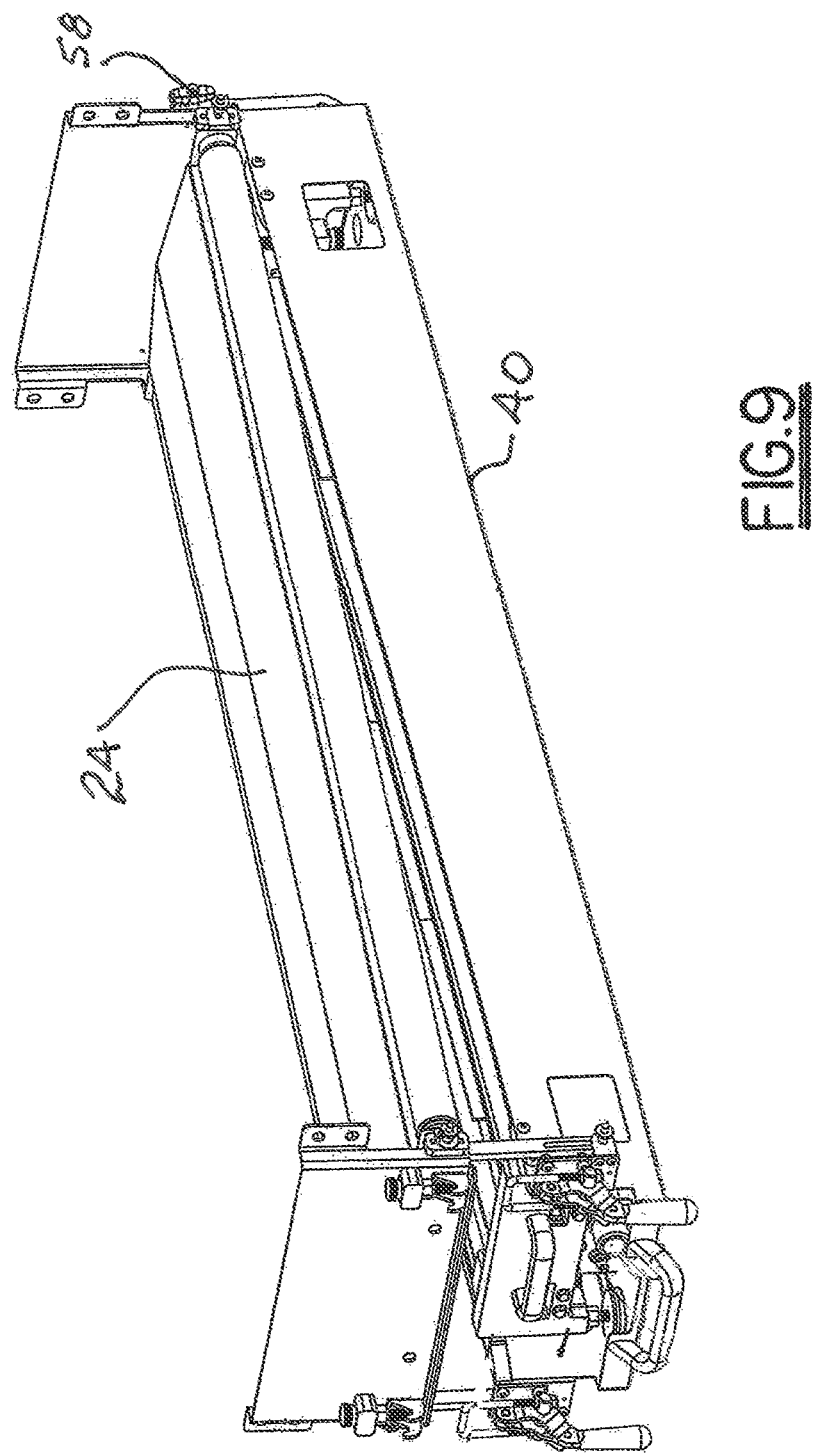

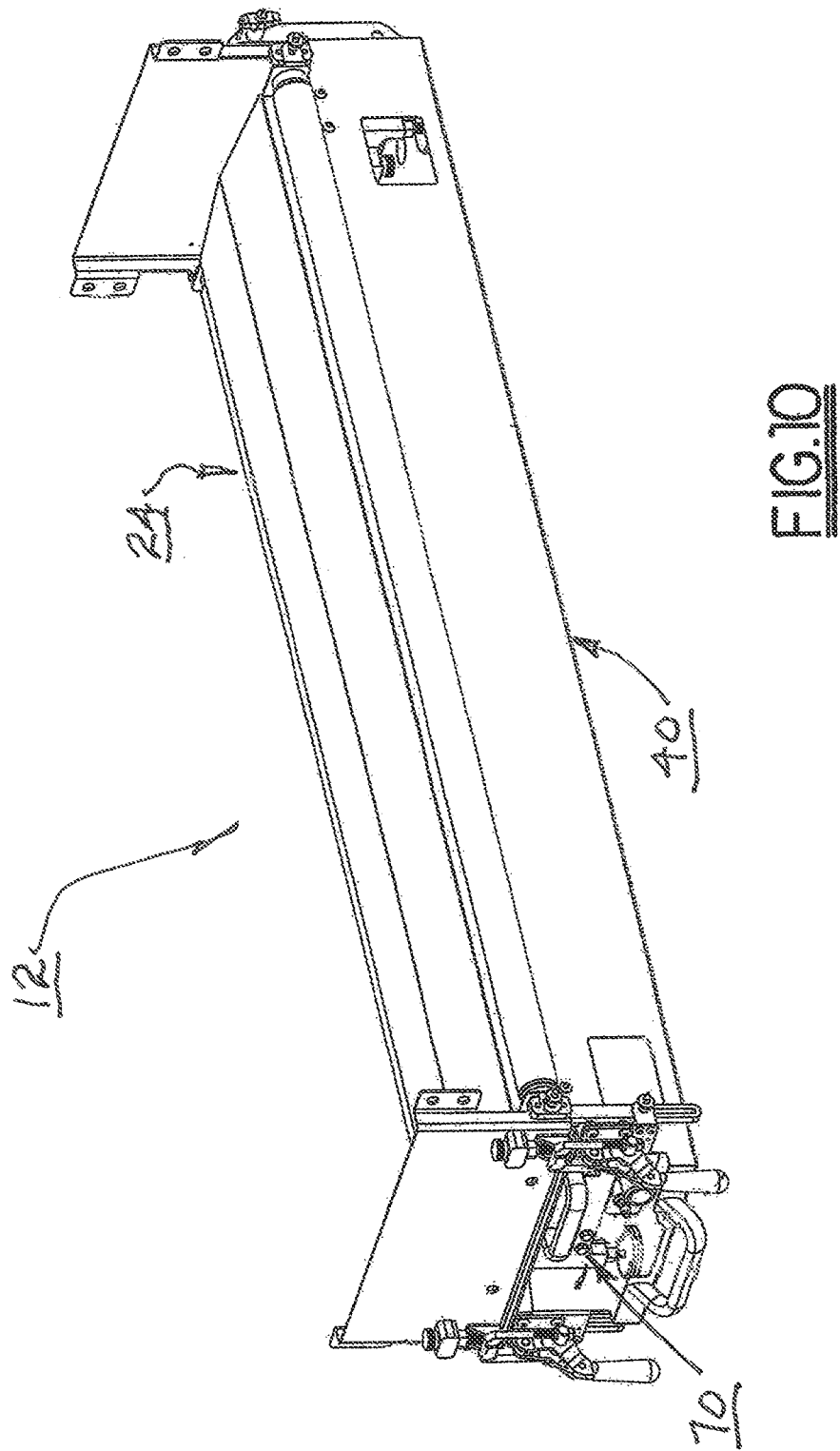

INVERTED BRUSHLESS CONVEYOR BELT CLEANER SYSTEM

RELATIONSHIP TO OTHER APPLICATIONS AND PATENTS

The present application is a Continuation-In-Part of U.S. patent application Ser. No. 17/408,716 (U.S. Pat. No. 11,242,210), entitled "Portable Brushless Conveyor Belt Cleaner System", filed Aug. 23, 2021, referred to hereinafter as "the '716 application" or "the parent application", which is hereby incorporated herein by reference in its entirety.

TECHNICAL FIELD

The present invention relates to systems and methods for cleaning the working surface of conveyor belts; more particularly, to systems and methods for cleaning soft or fabric conveyor belts as may be used, for example, in the continuous baking arts; and most particularly to such a conveyor belt cleaner system employing steam, a plurality of wipers, and vacuum, and preferably being disposed on the underside of a conveyor belt system for cleaning the belt working surface during the return pass of the belt.

BACKGROUND OF THE INVENTION

The present invention is directed to the art of cleaning the working surface of a conveyor belt.

In the prior art, conveyor belts used in various commercial activities are known to become soiled, typically with spillage from materials being conveyed or treated on the belt. It becomes desirable and necessary from time to time to clean at least the working surface of the belt. This is conveniently accomplished by installing a cleaning device in the path of the belt and allowing the belt to pass through the cleaning device, perhaps several times, if necessary, until the extraneous material is removed.

Conveyor belts may be divided into two categories, a) discontinuous chain-type belts formed of discrete metal or plastic elements in an articulated surface, and b) continuous belts formed of a flexible material such as plastic or fabric. The present invention is directed to systems for cleaning the working surface of a continuous conveyor belt.

In the prior art, U.S. Pat. No. 9,248,975 B2, issued Feb. 2, 2016 to Handy, discloses and claims "cleaning apparatus including a frame which includes end parts each mountable in a position adjacent a respective side edge of a conveyor to be cleaned, a cleaning unit selectively locatable to extend between the end parts to clean the conveyor, the cleaning unit being selectively movable when extending between the two end parts, between a rest position clear of the conveyor, and an in use position engaging with the conveyor, the frame also including a cross part extending between the end parts, wherein the cross part includes a pair of transverse guides, with which guides side edges of the cleaning unit are slidably engageable when moving to or from a position extending between the end parts". The cleaning unit is held in place in the use position by two over-center latches, one at each end.

A shortcoming of this system is that both over-center latches must be released to move the cleaning unit from the use position to the rest position and also to remove the cleaning unit from the frame. A further shortcoming is that the required pair of transverse guides adds an undesirable level of complexity to the structure of the frame. A still further shortcoming is that both the steam or cleaning solution feed and the vacuum extraction engage their respective transverse chambers through an end of the unit, rather than the center, such that the distribution of both cleaning solution and vacuum extraction are not symmetrically distributed across the width of the conveyor belt.

U.S. Pat. No. 10,954,077 B1, issued Mar. 23, 2021, to Yoo, discloses and claims "a conveyor belt cleaning apparatus . . . operating in a pneumatic manner using compressed air without using electricity. The conveyor belt cleaning apparatus uses a rodless cylinder so as to enable the steam spray nozzle to perform a reciprocating motion . . . ".

A shortcoming of this system is that a transversely reciprocating cleaning system cannot clean equally all areas of a moving substrate unless the speed of reciprocation is much greater than the speed of the substrate past the system.

U.S. Pat. No. 10,507,986 B2, issued Dec. 17, 2019, to Rogan, discloses and claims a conveyor belt cleaning apparatus comprising a belt scraper and an air knife. Unlike the present invention, the apparatus of Rogan does not employ steam to assist in the removal of food particles from the conveyor belt.

U.S. Pat. No. 10,836,586 B2, issued Nov. 17, 2020, to Schmidgall, discloses and claims a conveyor belt cleaner system comprising a pair of backing rollers for supporting an inverted conveyor belt and a scraper blade urged by springs again the belt surface to be cleaned. Unlike the present invention, the apparatus of Schmidgall does not employ steam to assist in the removal of food particles from the conveyor belt.

The present invention is directed to a system for cleaning the working surfaces of continuous conveyor belts formed of a flexible material such as plastic or fabric, using application of steam, surface wipers, and vacuum. Prior art cleaning systems are intended for use on a conveyor belt of a specified width, wherein the steam is distributed at substantially the full width of the belt. However, a common problem arises when applying a system designed for a first belt width to cleaning of a belt having a second and narrower width wherein the steam application occurs on both the belt surface and on the fixed conveyor frame and belt backing elements outboard of the moving belt. Such steam overspray results in undesirable condensation and water pooling on conveyor frame surfaces outboard of the belt, which eventually requires corrective measures which may include stopping the conveyor and the cleaning process to mop up the excess water.

This problem is solved by the apparatus disclosed and claimed in the parent application, wherein the width of steam application may be adjusted to accommodate belts of various widths, thereby making such a system significantly more versatile than prior art belt cleaning systems. The present invention applies the technology of the parent application to a continuous conveyor belt surface at a portion of the return path of the belt wherein the belt, and necessarily the cleaning apparatus, are inverted with respect to the system disclosed in the parent application.

SUMMARY OF THE INVENTION

In some applications, it can be desirable to be able to clean a conveyor belt at a position on its return path rather than on its forward path. Accordingly, the present invention adapts the concepts disclosed and claimed in the parent application to a configuration wherein both the conveyor belt to be cleaned and the cleaning mechanism are inverted with respect to the arrangement disclosed and claimed in the parent application.

The present invention is directed to a conveyor belt cleaner system, comprising:

1. first and second mounting plates attachable to opposite sides of a frame of a belt conveyor;
2. a backing platen subassembly and a pair of backing rollers positioned transversely of the conveyor belt between the first and second mounting plates and disposed behind a return length of the conveyor belt to be cleaned;
3. a bottom tray subassembly disposed between the first and second mounting plates;
4. a steam and vacuum cleaning subassembly disposed in the bottom tray subassembly comprising a first chamber defining a steam chamber transversely disposed under the conveyor belt to be cleaned and opening upwards, wherein the first transverse chamber is provided with a transverse steam header connectable to a source of steam; a second chamber defining a vacuum chamber adjacent the first chamber and transversely disposed under a second portion of the length of conveyor belt to be cleaned, wherein the second transverse chamber is operable under sub-atmospheric pressure and is provided with a suction outlet connectable to a source of vacuum, and wherein the first conveyor belt portion becomes the second conveyor belt portion by passage of the first portion from the first chamber into the second chamber; a first wiper disposed in the first chamber transversely of and in wiping contact with the first portion of the length of conveyor belt to be cleaned; a second wiper having a discontinuous wiping surface and defining a transverse septum between the first and second chambers; and a third wiper disposed in the second chamber transversely of and in wiping contact with the second portion of the length of conveyor belt to be cleaned; and apparatus being cooperative with the steam header to vary the width of steam application from the steam header onto the conveyor belt in accordance with a width of conveyor belt presented to the conveyor belt cleaner system. The steam and vacuum cleaning subassembly is provided with adjustable feet, preferably four at the four corners thereof and resting on the bottom of the box frame. Preferably the wipers are mounted on springs to ensure continuous wiping of the conveyor belt surface as the blade of the wiper becomes worn.

BRIEF DESCRIPTION OF THE DRAWINGS

The present invention will now be described, by way of example, with reference to the accompanying drawings, in which:

FIG. 8 is a detailed isometric view from of above showing the steam and vacuum subassembly installed in the supportive subassembly;

FIG. 9 is an isometric view from above of the inverted brushless conveyor belt cleaner system, showing the supportive subassembly in open mode after receiving the steam and vacuum subassembly; and FIG. 10 is an isometric view from above of the inverted brushless conveyor belt cleaner system, showing the supportive subassembly in closed mode, ready to begin cleaning an inverted conveyor belt in its return path.

DETAILED DESCRIPTION OF THE INVENTION

Throughout the following description, specific elements are set forth to provide a more thorough understanding of the invention. However, in some embodiments the invention may be practiced without some of these elements. In other instances, well known elements have not been shown or described in detail to avoid unnecessarily obscuring the disclosure. Accordingly, the specification and drawings are to be regarded as illustrative rather than restrictive. It is to be further noted that the drawings may not be to scale.

Figure 1:
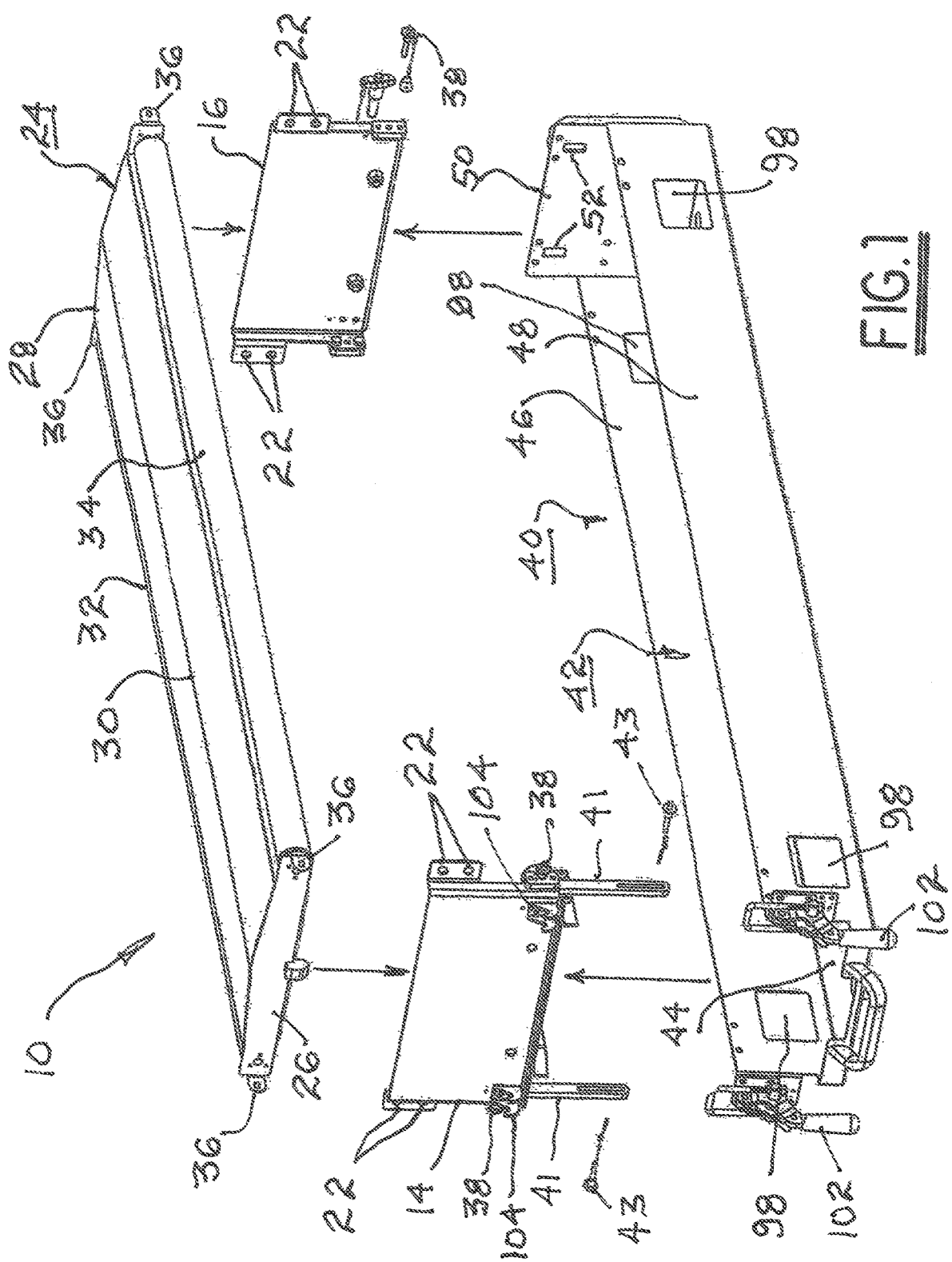
FIG. 1 is an exploded isometric view from above of a supportive subassembly of a conveyor belt cleaner system in accordance with the present invention.
Figure 2:
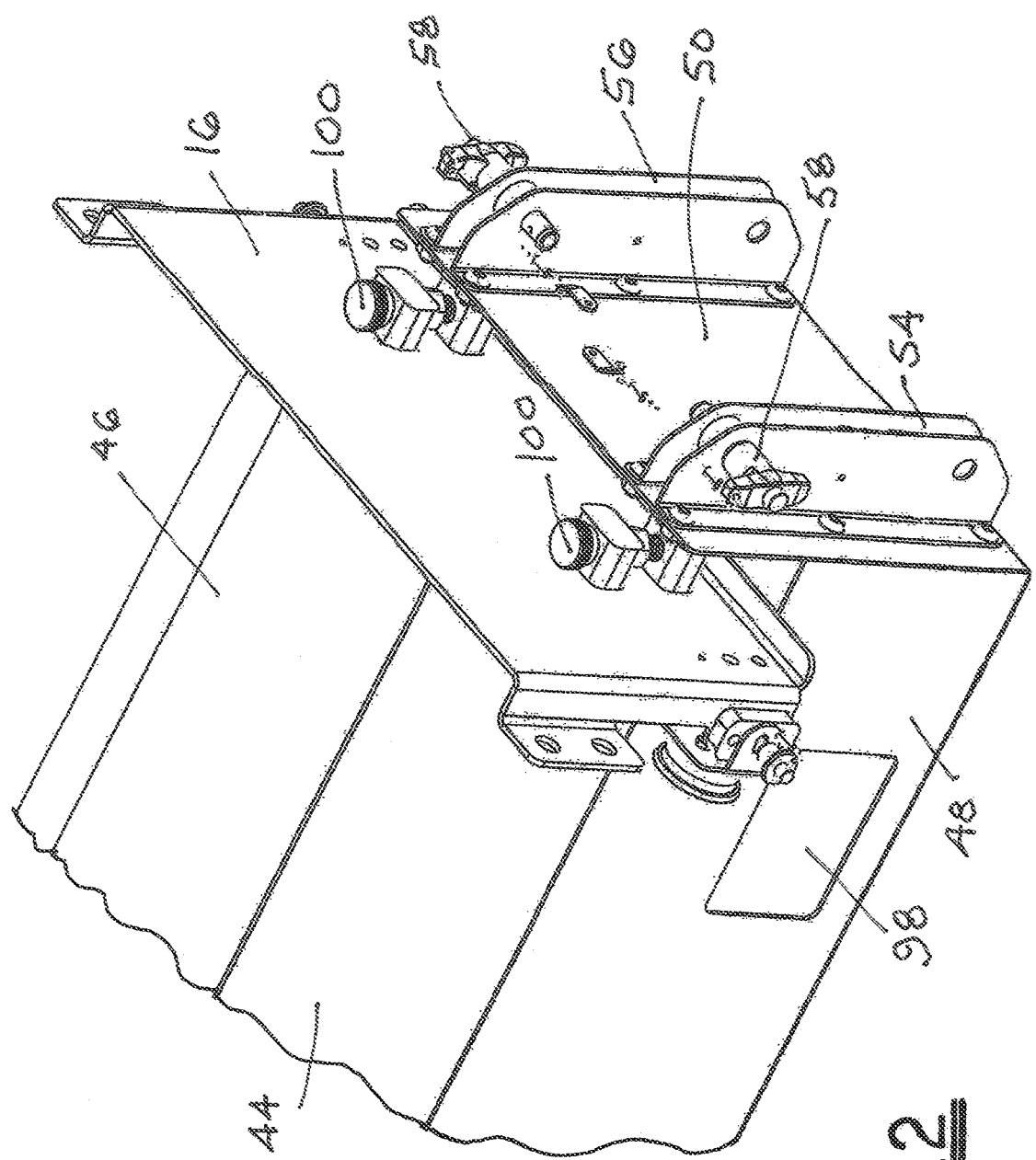
FIG. 2 is a detailed isometric view from above of a portion of the supportive subassembly shown in FIG. 1.
Figure 3:
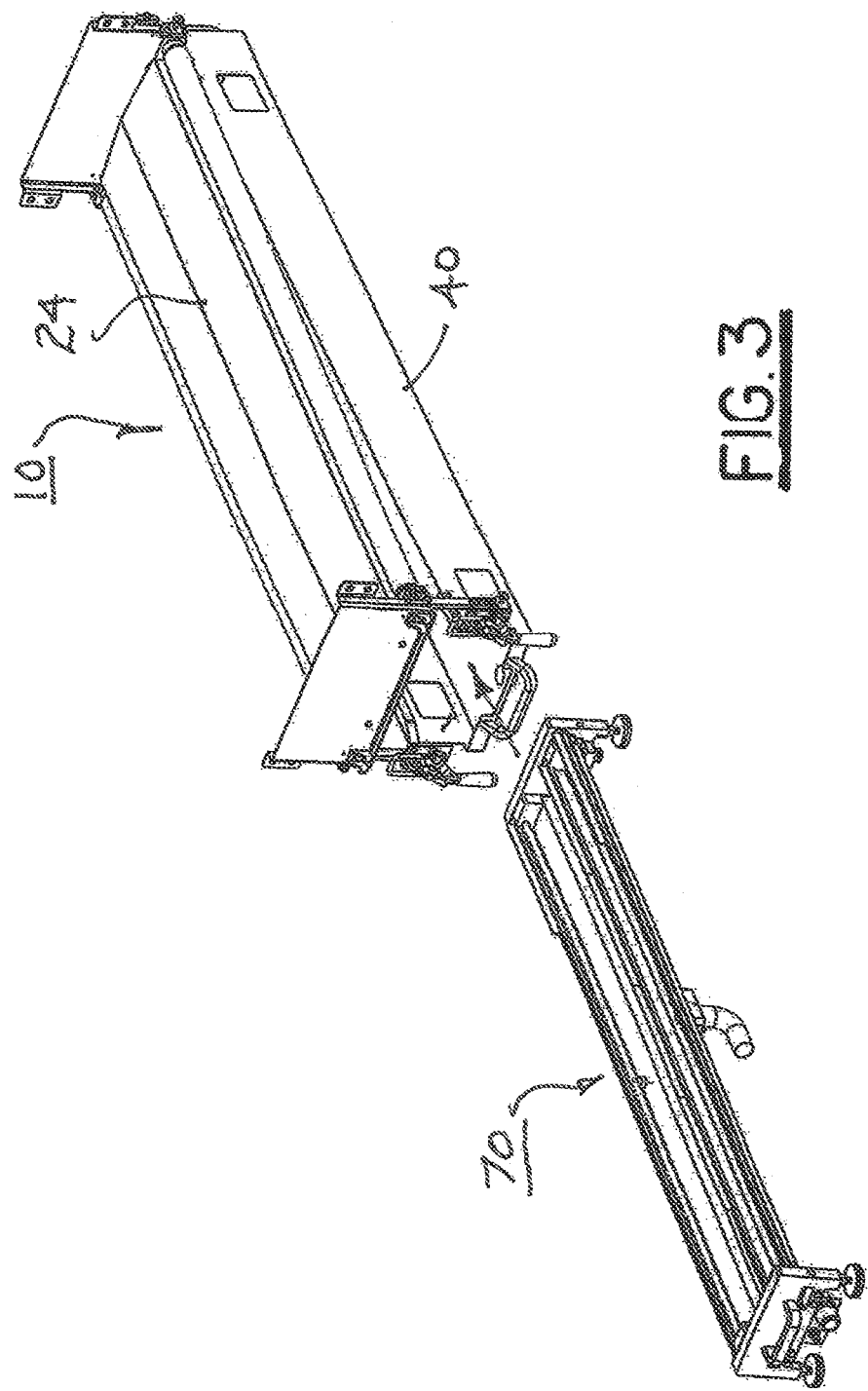
FIG. 3 is an exploded isometric view from above of a steam and vacuum cleaning subassembly and a supportive subassembly of a conveyor belt cleaner system in accordance with the present invention.

Referring now to FIGS. 1 through 10, a supportive subassembly 10 (FIG. 1) for an inverted brushless conveyor cleaner system 12 (FIG. 10) comprises first and second end plates 14,16 suitable for attachment to opposite sides of a frame 18 of a conveyor belt system 20 in the return path 21 thereof (FIG. 4) via bolt holes 22. A backing platen subassembly 24 comprises a first and second end pieces 26,28 supporting a backing platen 30 and first and second rollers 32,34. Each end piece is provided with brackets 36 at the ends thereof for securing subassembly 24 to end plates 14,16 via fasteners 38. Bottom tray 40 comprises a U-shaped channel 42 having a bottom 44 and left and right sides 46,48 and an end piece 50 attached to the U-shaped channel 42 and having slots 52 for receiving flanges (not shown) on end plate 16. The flanges extend through the slots 52 into matable relationships with flanges 54,56 disposed on end piece 50 where they are captured by removable pins 58 (FIG. 2) thereby forming hinges that permit bottom tray 40 to swing open away from backing platen subassembly 24 in the manner of a jaw, as shown in FIGS. 3 and 9, to permit entry of steam and vacuum subassembly 70 (FIG. 3). First end plate 14 is adjustably connected to bottom tray 40 via slotted extensions 41 and bolts 43.

Figure 5:
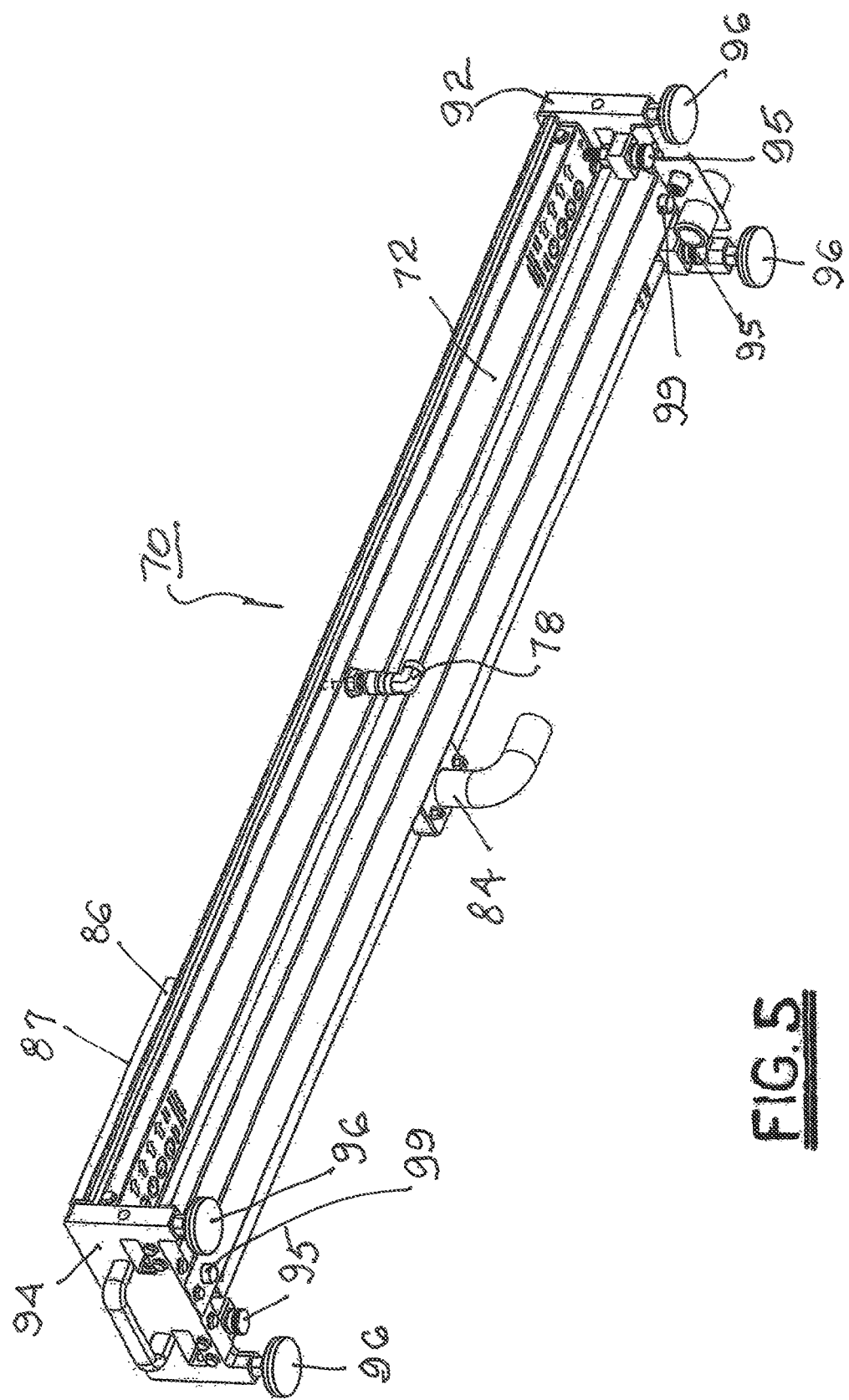
FIG. 5 is an isometric view from below of a steam and vacuum cleaning subassembly in accordance with the present invention.
Figure 6:
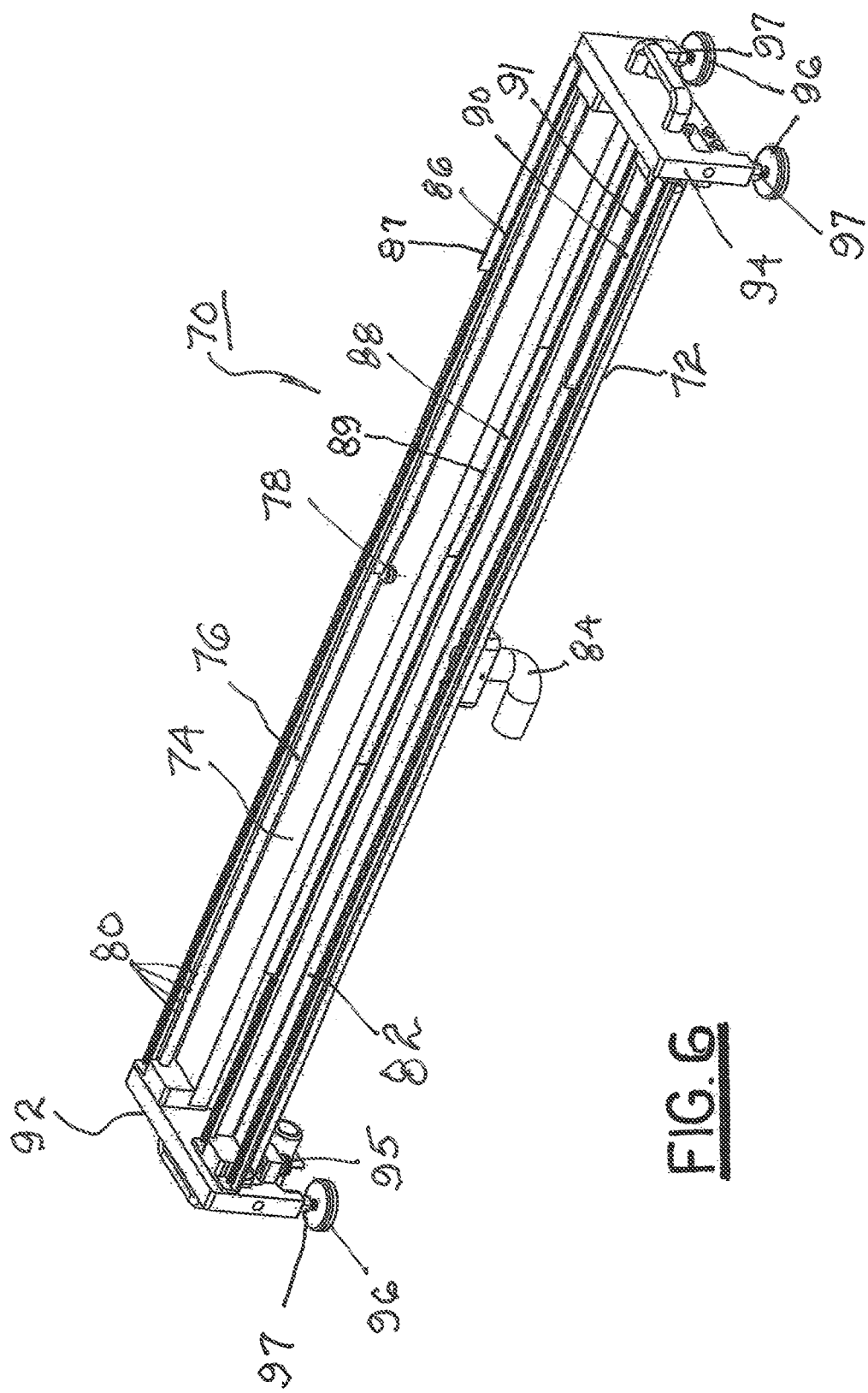
FIG. 6 is an isometric view from above of the steam and vacuum cleaning subassembly shown in FIG. 5.
Figure 7:
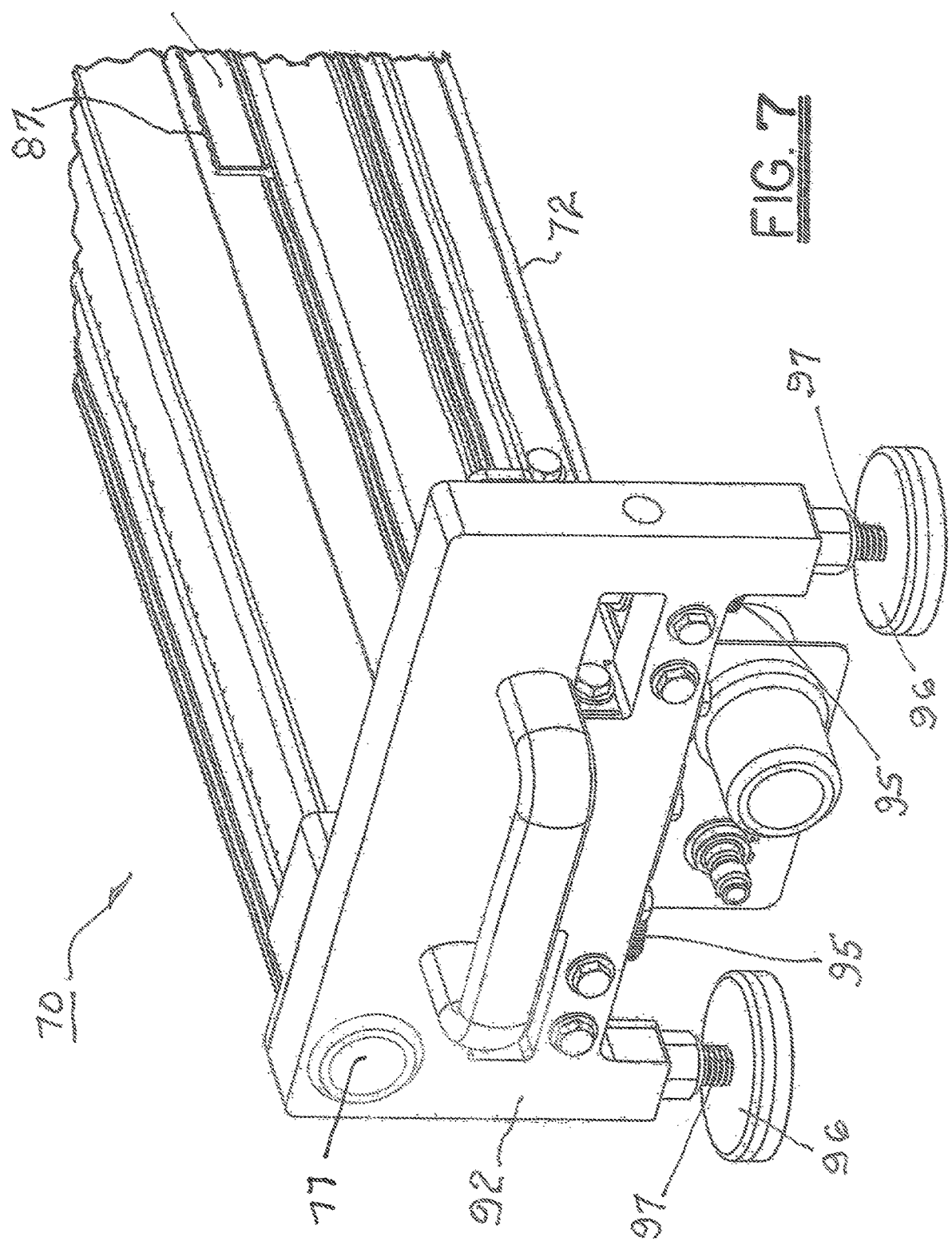
FIG. 7 is a detailed isometric end view of a steam and vacuum cleaning subassembly shown in FIG. 6.

Referring now to FIGS. 5, 6, and 7, steam and vacuum subassembly 70 is functionally identical with top assembly 18 disclosed in parent application Ser. No. 17/408,716 and therefore comprises several of the same elements.

Subassembly 70 comprises a formed transverse structural element 72 including a first chamber 74 defining a transverse steam chamber. First chamber 74 is provided with a tubular transverse steam header 76 connectable via a central nipple 78 to a source of steam (not shown). Steam header 76 is provided with a plurality of nozzle openings 80 spaced apart at regular intervals, preferably one inch, along the bottom of the steam header. Steam header 76 is open at each end to receive a steam-width control plug (not shown) as described in the parent application. Because of its inverted orientation, first chamber 74 can collect steam condensate and therefore is provided with drain openings 99 (FIG. 5). Referring to FIG. 7, knob 77 disposed on end plate 92 is attached to the outer end (not shown) of the steam-width control plug such that the steam-width control plug may be rotated by an operator to any desired rotational position to vary the width of steam application as described and shown in parent application Ser. No. 17/408,716.

A second chamber in structural element 72 defines a transverse vacuum chamber 82 adjacent steam chamber 74 operable under sub-atmospheric pressure and provided with a suction outlet 84 connectable to a source of vacuum (not shown).

First, second, and third transverse wiper blades 86,88,90 are as disclosed in the parent application.

A first transverse wiper 86 includes a first blade 87 in wiping contact with conveyor belt 21. First wiper 86 extends across the full width of conveyor belt 21 and defines the entrance to steam chamber 74.

A second transverse wiper 88 includes a second blade 89 in wiping contact with conveyor belt 21. Second wiper 88 extends across the full width of conveyor belt 21 defines the entrance to vacuum chamber 82 and has a discontinuous wiping blade 87; thus, blade 87 allows escape of steam and debris from steam chamber 74 into vacuum chamber 82.

A third transverse wiper 90 includes a third blade 91 in wiping contact with conveyor belt 21. Third wiper 90 extends across the full width of conveyor belt 21 and defines the exit for conveyor belt 21 from vacuum chamber 82. Water, steam, and debris in vacuum chamber 82 are wiped by third wiper 90 from conveyor belt 21 and sucked into suction outlet 84 for disposal, leaving cleaned conveyor belt 21 substantially dry when exiting conveyor belt cleaner system 12.

In alternate embodiment as depicted in several of the drawings (e.g., FIGS. 5 and 6), wipers 86,88,90 are depicted as extending less than the full width of the steam and vacuum subassembly.

Figure 4:
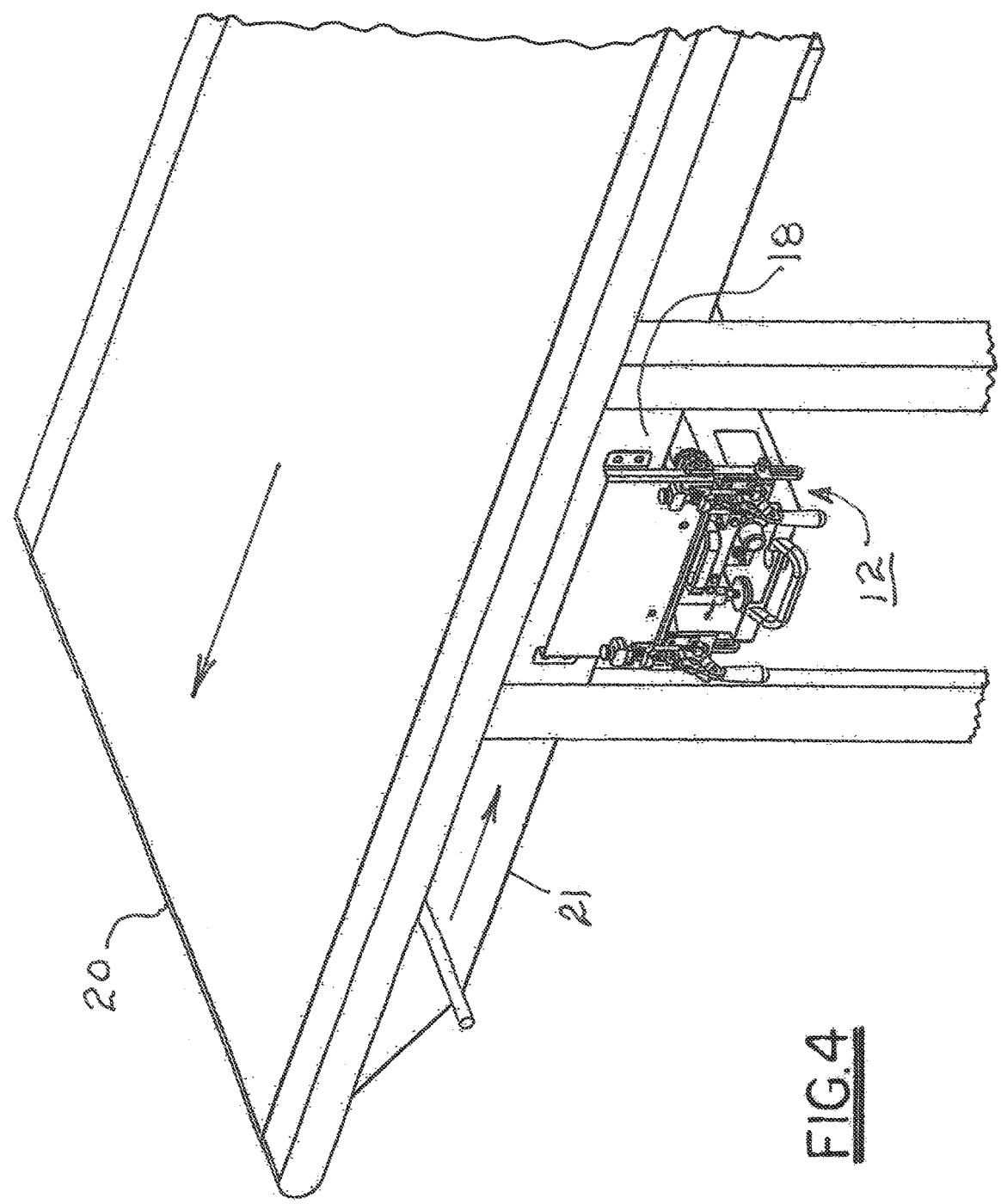
FIG. 4 is an isometric view from above of a complete inverted brushless conveyor belt cleaner system installed on a conveyor frame in the return path of the conveyor belt.

In steam and vacuum subassembly 70, structural element 72 is floating between opposed end pieces 92,94. Each end piece is provided with two adjustment screws 95 that impinge on structural element 72 for regulating the vertical position thereof, and therefore of wiper blades 86,88,90 with respect to the surface 21 of conveyor belt system 20 (FIG. 4). Preferably, the wiper blades are slightly compressed vertically and thereby slightly flexed, insuring good wiping contact with conveyor belt 21 in the return pass thereof.

Similarly, the vertical position of bottom tray 40 with respect to end plates 14,16, which are fixed in space to the conveyor frame, is governed by four adjustment screws 100 mounted on end plates 14,16. Further, bottom tray 40 is provided with two over-center latches 102 that engage respective catches 104 on end plate, by means of which bottom tray 40 be pivoted to the open position, as described above when the latches are open, or to a closed position as shown in FIGS. 8 and 10, when the inverted brushless conveyor cleaner system 12 is ready for operation.

Steam and vacuum subassembly 70 further comprise four feet 96, that optionally may be adjustable and as depicted in FIGS. 6 and 7 relying upon screws 97, that rest on tray bottom 44 after the subassembly is inserted into supportive structure 10. Access to feet 96 is provided via windows 98 in tray sides 46,48 for an operator to adjust the four corners of subassembly 70 as may be needed to ensure that the three wiper blades engage the conveyor belt surface uniformly across its entire width.

Steam and vacuum subassembly 70 preferably also comprises a vacuum velocity compensator (not shown) disposed in vacuum chamber 82 as disclosed in the parent application.

While the invention has been described by reference to various specific embodiments, it should be understood that numerous changes may be made within the spirit and scope of the inventive concepts described. Accordingly, it is intended that the invention is not limited to the described embodiments but will have full scope defined by the language of the following claims.

What is claimed is:

1. A system for cleaning conveyor belts on a return pass thereof, comprising:
   a) a structural support subassembly comprising
      i) a backing platen subassembly including a backing platen and a plurality of rollers disposable adjacent a back side of a length of said conveyor belt to be cleaned during passage of said conveyor belt over said backing platen assembly during cleaning of said conveyor belt;
      ii) first and second end plates supportive of said backing platen subassembly and mountable to a frame of a conveyor belt system; and
      iii) a bottom tray subassembly pivotably attached to said second end plate and having at least one latch for releasably attaching said bottom tray to said first end plate;
   b) a steam and vacuum subassembly removably disposed within said structural support subassembly adjacent a side of said conveyor belt to be cleaned comprising
      i) a first chamber defining a steam chamber provided with a steam header connectable to a source of steam and having at least one exit for steam in the top side of said steam header;
      ii) a second chamber defining a vacuum chamber adjacent said first chamber operable under sub-atmospheric pressure and provided with a suction outlet connectable to a source of vacuum;
      iii) a first wiper disposed in wiping contact with said conveyor belt to be cleaned, said first wiper defining an entrance to said steam chamber;
      iv) a second wiper defining a septum between said steam and vacuum chambers;
      v) a third wiper disposed in wiping contact with said conveyor belt to be cleaned and defining an exit from said vacuum chamber; and
      vi) apparatus including an adjustable steam application assembly that accommodates varying belt widths with said steam header to vary the width of steam application from said steam header onto said conveyor belt, said steam width application being variable in accordance with a width of conveyor belt presented to said conveyor belt cleaner system.

2. A system in accordance with claim 1 wherein said second wiper includes a discontinuous blade.

3. A system in accordance with claim 1 wherein said system includes a plurality of height adjustment mechanisms to position the steam and vacuum subassembly at a desired location with respect to said conveyor belt to provide uniform wiping of said conveyor belt by said wipers.

4. A system in accordance with claim 1 wherein said bottom tray subassembly includes a latching mechanism for removably attaching said bottom tray subassembly to at least one of said end plates.

5. A system in accordance with claim 1 further comprising an adjustable steam application assembly cooperative with said steam header to vary the width of steam application from said steam header onto said conveyor belt, comprising:
   a) a plurality of nozzles formed in said steam header;
   b) a tubular plug longitudinally disposed within an end of said steam header and having a plurality of steps formed at different lengths and azimuths of said plug; and
   c) a control knob attached to an outer end of said tubular plug to rotate said plug to any desired rotational orientation to alternatively expose or eclipse a predetermined number of said nozzles as may be dictated by the width of said conveyor belt to be cleaned.

6. A system in accordance with claim 5 comprising an assembly of said apparatus cooperative with said steam header to vary the width of steam application from said steam header onto said conveyor belt disposed in each end of said steam header.

7. A system in accordance with claim 5 further comprising a detent mechanism for stopping said plug in a desired rotational position to establish a desired width of steam application to said conveyor belt.

8. A system in accordance with claim 1 further comprising an adjustable steam application assembly cooperative with said steam header to vary the width of steam application from said steam header onto said conveyor belt comprises:
 a) a longitudinal slot formed in said steam header;
 b) a tubular plug longitudinally disposed within an end of said steam header and having a longitudinal bevel; and
 c) a control knob attached to an outer end of said tubular plug to rotate said tubular plug to any desired rotational orientation to alternatively expose or eclipse a predetermined length of said slot as may be dictated by the width of said conveyor belt to be cleaned.

9. A system in accordance with claim 1 further comprising a vacuum velocity compensator disposed in said second chamber.

10. A system in accordance with claim 9 wherein said vacuum velocity compensator is provided with a central opening matable with said suction outlet and is formed such that widthwise flow velocity of steam from ends of said second chamber toward said suction outlet is sufficient to carry debris in said second chamber to said suction outlet.

11. A system in accordance with claim 1 wherein said steam and vacuum subassembly comprises at least one mechanism including a transverse chamber for at least one of said wipers, at least one captive spring disposed in said chamber and bearing on said at least one wiper, and a mechanism for retaining said spring under compression,
 wherein said chamber includes an exit slot to allow a blade of said wiper to protrude from said chamber and thereby engage said conveyor belt being cleaned.

\* \* \* \* \*